(12) United States Patent
Mawanda

(10) Patent No.: US 8,224,383 B2
(45) Date of Patent: Jul. 17, 2012

(54) EXTENSIBLE MOBILE COMPUTING PLATFORM

(76) Inventor: Musa Mawanda, Hayward, CA (US)

( * ) Notice: Subject to any disclaimer, the term of this patent is extended or adjusted under 35 U.S.C. 154(b) by 0 days.

(21) Appl. No.: 12/961,485

(22) Filed: Dec. 6, 2010

(65) Prior Publication Data

US 2011/0136540 A1     Jun. 9, 2011

Related U.S. Application Data

(60) Provisional application No. 61/267,007, filed on Dec. 4, 2009.

(51) Int. Cl.
*H04B 1/38* (2006.01)
(52) U.S. Cl. ..... 455/557; 455/41.2; 455/566; 455/426.1
(58) Field of Classification Search .................. 455/557, 455/41.2, 566, 426.1
See application file for complete search history.

(56) References Cited

U.S. PATENT DOCUMENTS

| | | |
|---|---|---|
| 6,286,060 B1 | 9/2001 | DiGiorgio |
| 6,407,914 B1 | 6/2002 | Helot |
| 6,654,826 B1 | 11/2003 | Cho |
| 6,765,789 B2 | 7/2004 | Yang |
| 6,810,450 B2 | 10/2004 | Chuang |
| 7,054,965 B2 | 5/2006 | Bell |
| 7,120,462 B2 | 10/2006 | Kumar |
| 7,231,481 B2 | 6/2007 | Scott |
| 7,580,255 B2 | 8/2009 | Crooijmans et al. |
| 2005/0135393 A1 | 6/2005 | Benco et al. |
| 2005/0202846 A1* | 9/2005 | Glass et al. ................... 455/557 |
| 2006/0147214 A1 | 7/2006 | Ruiz |
| 2006/0190652 A1* | 8/2006 | Keely et al. ................... 710/303 |
| 2009/0023475 A1* | 1/2009 | Chang et al. |
| 2009/0231801 A1* | 9/2009 | Cummins |
| 2010/0137028 A1* | 6/2010 | Farris et al. ................... 455/557 |

\* cited by examiner

*Primary Examiner* — Kamran Afshar
*Assistant Examiner* — Yousef Rod
(74) *Attorney, Agent, or Firm* — Nwamu, PC; Fidel D. Nwamu

(57) ABSTRACT

An extensible mobile computing platform. The extensible system can extend the mobile communication device resources by pairing the mobile communication device with a mobile extender device. The mobile device extender device includes peripheral ports that can receive standard peripherals so that users can operate the peripherals when the mobile communication device and the mobile extender device are paired. The mobile extender device includes an ASIC (application specific integrated circuit), operating system and an extender device component. The mobile communication device includes a mobile communication device component as well as a powerful processor and an operating system.

14 Claims, 5 Drawing Sheets

EXTENSIBLE MOBILE COMPUTING PLATFORM

CLAIM OF PRIORITY

This application claims priority from Provisional Patent Application Ser. No. 61/267,007 entitled "Unified Mobile Computing Platform" filed Dec. 4, 2009, the specification of which is hereby incorporated by reference as if fully set forth herein.

COMPUTER PROGRAM LISTING APPENDIX

A computer program listing appendix is provided on one CD-ROM (or via EFS) with this application. The information is hereby incorporated by reference as if set forth in full in this application for all purposes. A portion of the disclosure recited in this application contains material which is subject to copyright protection. Specifically, the computer program listing appendix and possibly other portions of the application may recite or contain source code, data or other functional text. The copyright owner has no objection to the facsimile reproduction of the functional text; otherwise all copyright rights are reserved.

BACKGROUND OF THE INVENTION

The present invention relates generally to mobile communications systems and methods and more specifically to mobile communication systems and methods for extending mobile device communication platforms.

The penetration rate of mobile communication devices used for wireless communication is reaching an all-time high. It is estimated that the mobile communication market will reach billions of consumers within the next few decades.

One reason for this mobile communication device ubiquity is affordability. Mobile communication devices are less expensive relative to desktop computing devices. Even more importantly, today's mobile communication devices have powerful processors some of which might arguably compare to desktop computing processors.

Despite the powerful processors incorporated by today's PDAs, many users located in more affluent world regions also have home or office desktop computers separate and apart from their mobile communication devices. Many such users can easily utilize their desktop computers for longer periods because such computers typically have full-size or standard keyboards and video display monitors. Users can also store more data on desktop computers.

Users in less affluent regions of the world, however, must contend with the small form factor of mobile communication devices since such users cannot afford alternative home or office desktop computers. After long periods, such users can become fatigued as their fingers are typically larger than the data-pads provided on the mobile communication devices. This usage fatigue might cause erroneous keyboard entry. Users must also view data outputs on smaller mobile device displays. Consequently, many such users can utilize mobile communication devices only for limited time periods.

It is thus within the aforementioned context that a need for the present invention has arisen. The present invention meets this need by addressing one or more of the foregoing disadvantages of conventional systems and methods.

BRIEF SUMMARY OF THE INVENTION

Various aspects of an extensible system for extending resource capabilities of a mobile communication device can be found in exemplary embodiments of the present invention.

In one embodiment, the extensible system can extend the mobile communication device resources by pairing the mobile communication device with a mobile extender device. Here, note that the pairing between the mobile communication device and the mobile extender device occurs by using a wireless protocol. The mobile device extender device itself has various interface ports that can receive standard peripherals. Examples of such standard peripherals include a full-size keyboard device, a pointing device, a display device and a networking adapter.

The mobile extender device includes an ASIC (application specific integrated circuit), operating system and an extender device component. The mobile communication device includes a mobile communication device component as well as a powerful processor and an operating system.

The mobile extender device components works cooperatively with the mobile communication device components so that a user can utilize the standard aforementioned peripherals (including storage) to manipulate applications on the mobile communication device as if such applications were being manipulated by mobile communication device input devices. Here, the applications are run by the mobile communication device processor and operating system and memory.

Thus, an advantage of the present invention is that many users whether located in affluent or non-affluent world regions need not purchase a home or office desktop computer separate and apart from their mobile communication devices. Users can easily utilize their mobile communication devices and the powerful processors they incorporate since users can utilize the full-size or standard keyboards and video display monitors available or attachable to the mobile extender device. Users need not become fatigued and erroneous keyboard entry can be avoided. Users can store more data on attached storage as well.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail as to not unnecessarily obscure aspects of the present invention.

Figure 1:
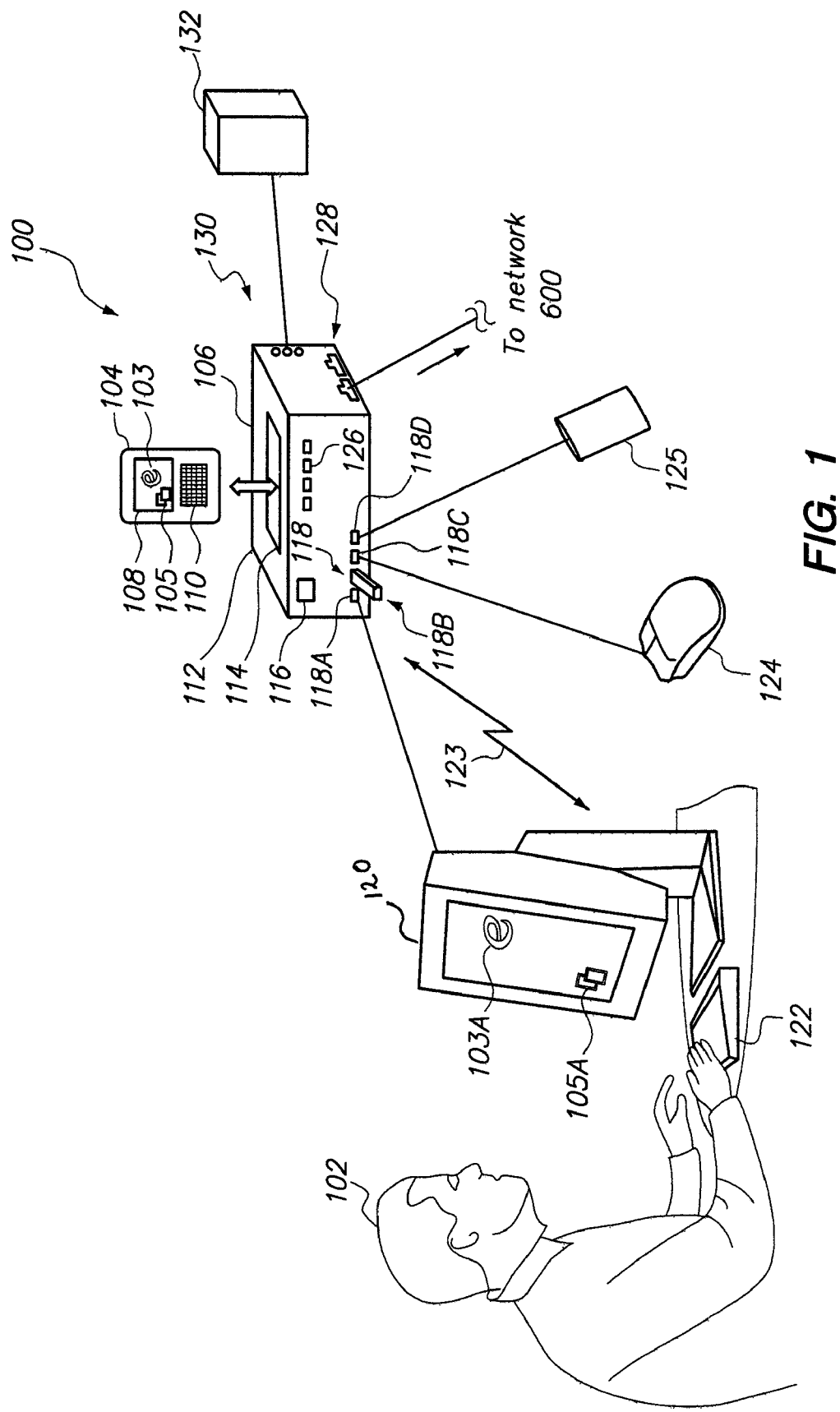
FIG. 1 illustrates an extensible mobile device system according to an exemplary embodiment of the present invention.

FIG. 1 illustrates extensible mobile device system 100 according to an exemplary embodiment of the present invention.

In FIG. 1, extensible mobile device system 100 comprises among other components mobile communication device 104 and mobile extender device 106 communicably coupled via a communication link. By communication link, it is meant that both devices are coupled via a wireless link. As an example, the communication link might be Wi-Fi complying with an IEEE 802.11 standard protocol. Other comparable wireless protocols can be utilized.

As shown, mobile communication device 104 is a wireless communication device that can be utilized for e-mail functions, web browsing, faxing, personal organizing, word processing, etc., and, of course, basic voice communication. Mobile communication device 104 includes display 108 and a mini-keyboard or data pad 110.

Display 108 might be a conventional display having 3.1 inch capacitive display and resolution of 480×320. Data pad 110 is a mini-sized QWERTY type keyboard also having a diagonal length that is preferably 3.1 inches. Although not shown, mobile communication device 104 might have an input device such as a track ball for manipulating data displayed via display 108.

Mobile extender device 106 can communicate with and receive mobile communication device 104. Among other components, mobile extender device 106 includes housing 112 into which base 114 for receiving mobile communication device 104 is incorporated. Housing 112 is three dimensional having a suitable length, width and height. Although not shown, the length, width and height might be 6 by 4 by 1 inches, respectively.

Housing 112 can be made of any suitable polymeric material such as PVC or the like. Housing 112 might be unitarily formed using an injection molding process. Although a preferred embodiment has been described, one of ordinary skill in the art will realize that housing 112 is simply an enclosure and can be modified and formed as proves necessary.

Base 114 of mobile extender device 106 is preferably rectangular shaped and can receive mobile communication device 104. Unlike conventional systems, base 114 is capable of receiving mobile communication device 104 without being electrically coupled to mobile communication device 104. Base 114 simply functions to seat mobile communication device 104 and retain said device in an upright position.

Base 114 has a length that depends on the dimensions of mobile communication device 104. For example, if the bottom length of mobile communication device 104 is 2.5 inches, base 114 might have a length of 3 inches. As noted, base 114 is simply an aperture and has no electrical connectors to which mobile communication device 104 is connected when mobile communication device 104 is seated within base 114.

In FIG. 1, housing 112 also includes power button 116 and a plurality of peripheral ports 118. Specifically, peripheral ports 118A, 118B, 118C and 118D might be USB 2.0/3.0 ports, serial communication interfaces, i.e., RS-232, RS-424, RS-485 or synchronous serial communication interface, high-definition multimedia extensions including HDMI, DVI and VGA ports or other comparable interfaces Here, peripheral port 118A is coupled to display monitor 120; peripheral port 118 is coupled to a standard full-size keyboard 122; peripheral port 118C is attached to pointing device 124 and peripheral port 118D is coupled to external storage 125. Note that keyboard 122 and port 118B are communicably coupled via a Bluetooth connection 123. Although not shown, peripherals may be connected to mobile extender device 106 via a wireless link. Note also that display monitor 120, keyboard 122 and pointing device 124 are standard full-sized peripherals typically associated with a desktop home or office computing device. Thus, keyboard 122 is a full-sized QWERTY device, for example.

Mobile extender device 106 also includes indicator lights 126 that indicate whether a wireless connection has been established between mobile extender device 106 and mobile communication device 104. As an example, indicator light 126 flashes red when no connection exists and flashes green when a wireless connection is established between mobile communication device 104 and mobile extender device 106.

Mobile extender device 106 also includes network ports 128 and audio ports 130. Network ports 128 are compatible Ethernet protocol specifications for connection to LANs (Local Area Networks) and other network types. Here, network port 128 is coupled to network 400 further described with reference to FIG. 4, while audio port 130 and audio device 132 are coupled.

Note that the aforementioned peripheral ports can also provide high-definition audio jacks for audio port 130 and high-resolution cameras for video conferencing, HDMI, DVI and VGA for the peripheral ports. Note also that distributed graphics rendering between mobile extender device 106 and mobile communication device 104 can occur in order to provide richer graphics.

Here, user 102 can position mobile communication device 104 within mobile extender device 106 in order to utilize display monitor 102, keyboard 122, pointing device 124, network 600 (FIG. 6) and speaker 132. Use and operation of mobile communication device 104 and mobile extender device 106 are more fully described with reference to FIG. 5, below.

Figure 2:
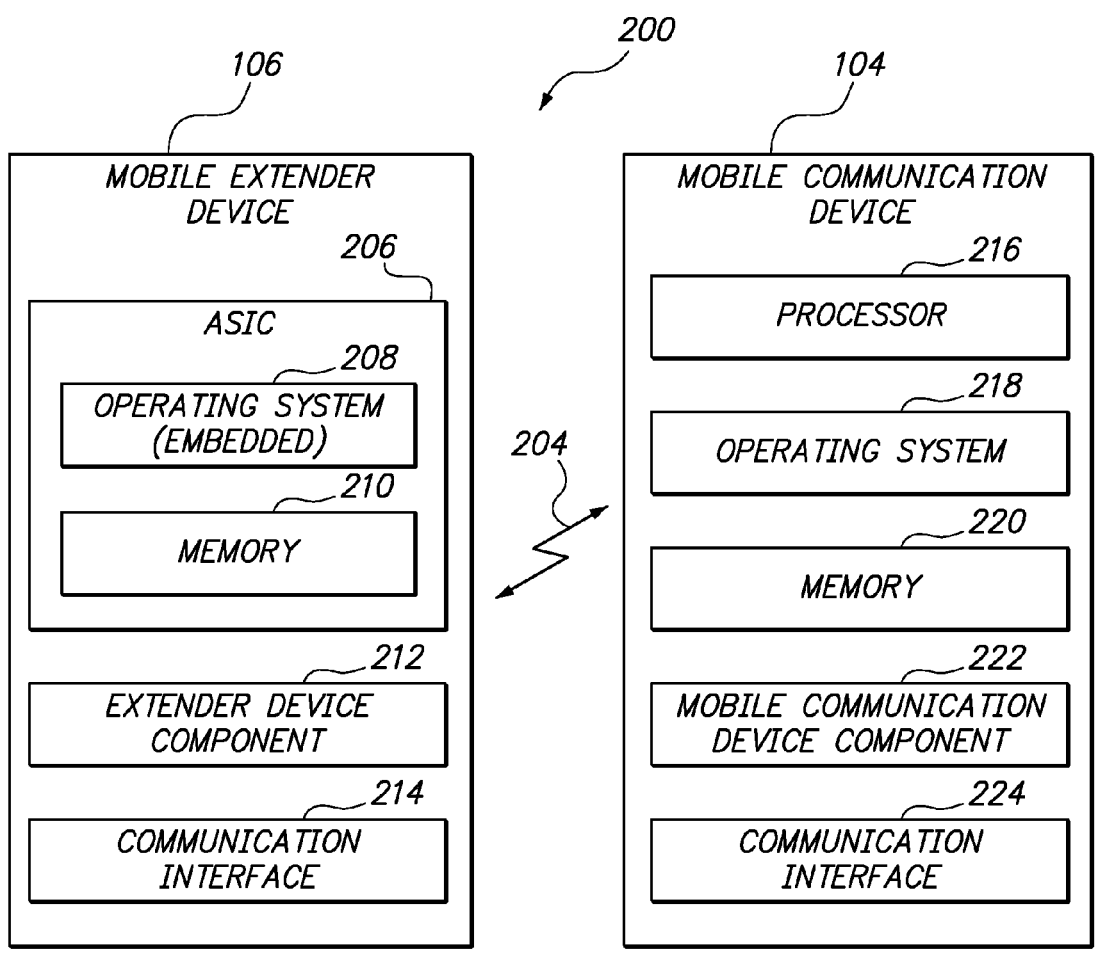
FIG. 2 illustrates a component block diagram of the extensible mobile device system of FIG. 1.

FIG. 2 illustrates a component block diagram of extensible mobile device system 100 of FIG. 1 having mobile communication device 104 and mobile extender device 106 according to an exemplary embodiment of the present invention.

In FIG. 2, mobile communication device 104 and mobile extender device 106 are communicably coupled via communication link 204. Communication link 204 is a wireless link or other comparable interface type. Preferably, communication link 204 supports Wi-Fi connectivity including various protocol standards relating to IEEE 802.11A/B/G/N and other comparable wireless protocols.

Mobile extender device 106 comprises an ASIC (Application Specific Integrated Circuit) 206 in which operating system 208 and memory 210 are embedded. Memory 210 can include ROM, RAM, EEPROM, flash and other comparable memory types. Operating system 208 can be a streamlined version of any conventional operating system. Preferably, operating system 208 can be Linux, Android or other comparable operating systems consistent with the spirit and scope of the present invention.

ASIC 206 is a chip (preferably 32 bit) designed specific to mobile extender device 106 by using a hardware design language tool such as Verilog. ASIC 206 or components therein are available from Xilinx of San Jose, Calif. for example. Although not shown, ASIC 206 can be a general purpose computer that includes an operating system and memory as well. However, an ASIC is preferable so as to reduce costs and provide efficiencies of scale to intended user 102.

Mobile extender device 106 further includes extender device component 212 that can interface with local peripherals coupled to mobile extender device 106 as well as to interface with mobile communication device 104 in order to permit the mobile extender local peripherals to function with mobile communication device 104. One skilled in the art will realize that extender device component may be a single component such as client software, hardware or a combination of hardware and software. Extender device component 106 is further described with reference to FIG. 3.

Communication interface 214 comprises a plurality of external hardware interfaces (FIG. 1) and associated logic interface circuitry that oversee the appropriate signal levels for communication with mobile communication device 104. Specifically, the external hardware interfaces include peripheral ports 118A, 118B, 118C, 118D, network ports 128 and audio ports 130 (as shown in FIG. 1).

In accordance with the present invention, communication interface 214 further comprises a transmit/receive adapter and associated logic circuit for establishing and authenticating a wireless communication link between mobile extender device 106 and mobile communication device 104. As noted, such wireless communication can be Wi-Fi, Bluetooth or other comparable wireless communication protocols.

In FIG. 2, mobile communication device 104 includes processor 216 and operating system 218. Processor 216 can be any conventional but powerful mobile device processor while operating system 218 might be any known mobile device operating system such as the Android or Linux operating system. Memory 220 can include ROM, RAM, EEPROM, flash and other comparable memory types.

Mobile communication device component 222 interfaces with extender device component 212 to facilitate input output functions such that the mobile extender device peripherals can function with mobile communication device 104. One skilled in the art will realize that mobile communication device component 222 may be a single component or multiple components that might be implemented as server software, hardware or a combination of hardware and software. Mobile communication device component 222 is further described with reference to FIG. 4.

Communication interface 224 comprises external hardware interfaces and associated logic interface circuitry. Such external hardware interfaces include a USB interface, datapad and display interfaces for example. In accordance with the present invention, communication interface 224 further comprises a transmitter/receiver (not shown) and associated logic circuit that can communicate with the transmitter and receiver of mobile extender device 106 to establish and authenticate a wireless communication link.

Such a wireless communication link can be Wi-Fi, Bluetooth or other comparable wireless communication protocols. One advantage of mobile extender device 106 is that it provides low-power usage due to reduced computational processing functions, replaceable primary and optional secondary batteries and direct charging of mobile communication device 104 via any USB peripheral port.

Figure 3:
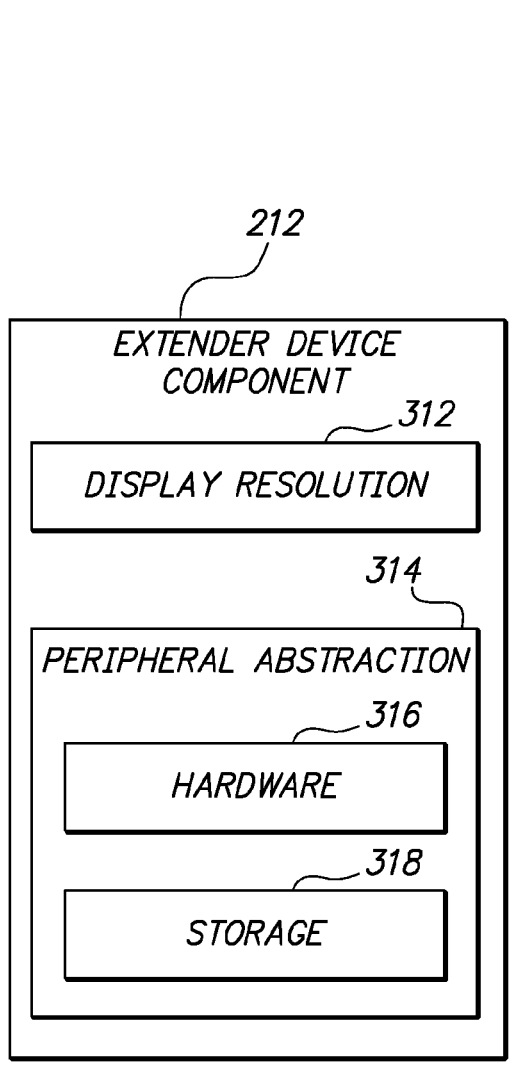
FIG. 3 illustrates an extender device component of FIG. 2 according to an exemplary embodiment of the present invention.

FIG. 3 illustrates extender device component 212 of FIG. 2 according to an exemplary embodiment of the present invention.

In FIG. 3, extender device component 212 comprises display resolution 312 and peripheral abstraction 314. Display resolution 312 allows the applicable resolution of display monitor 120 (FIG. 1) to be set. Display resolution 312, for example, might display a series of options for setting the resolution of display monitor 120. A first option might be 1024×768, a second option for 800×600, or a third option for 1920×1200 may be displayed. By so providing, user 102 can select the appropriate options to match the resolution of display monitor 120.

Figure 6:
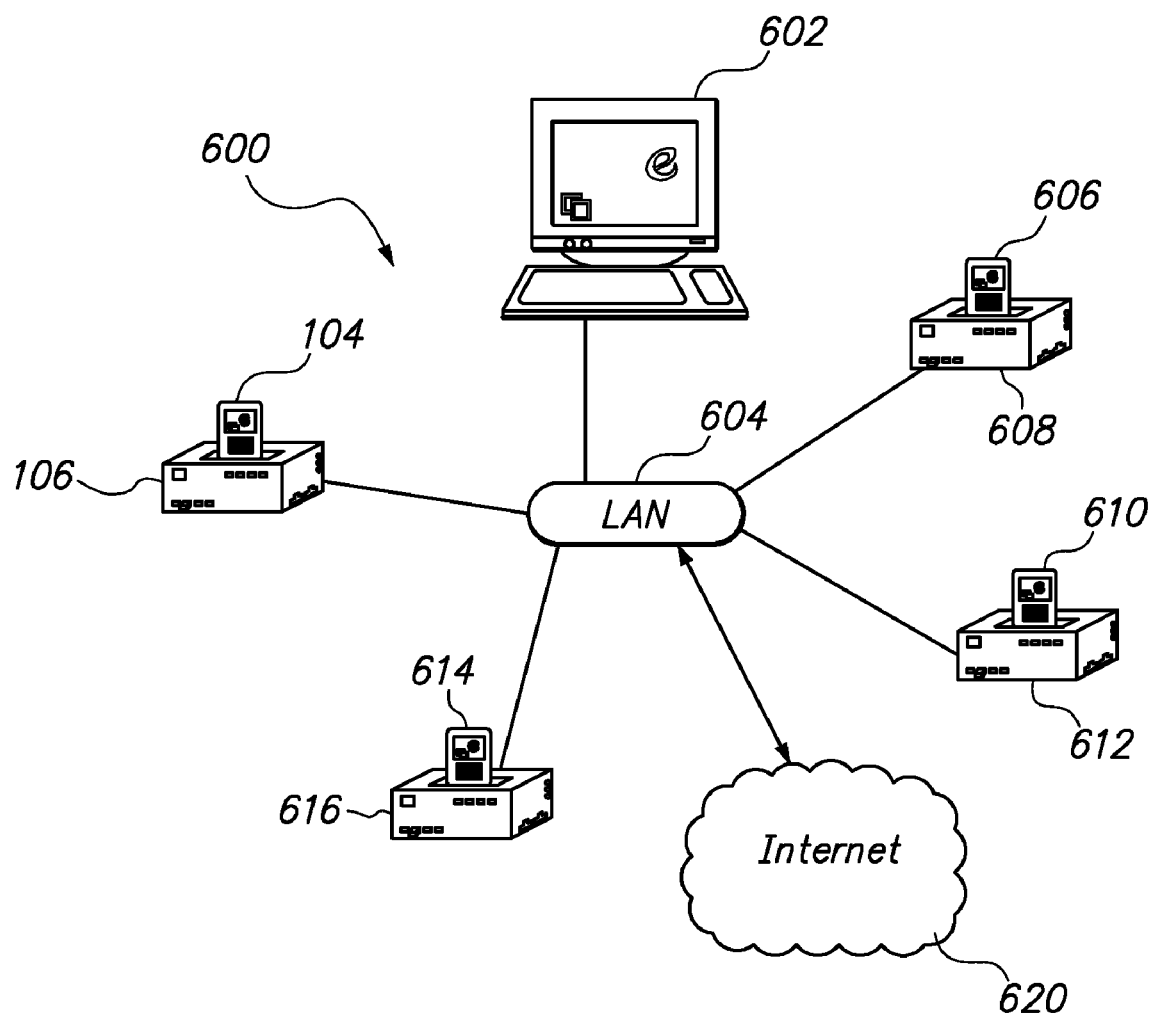
FIG. 6 illustrates extensible mobile network 600 according to an exemplary embodiment of the present invention.

Peripheral abstraction 314 includes hardware 316 and storage 318. As implied by its name, peripheral abstraction 314 abstracts local peripherals coupled to mobile extender device 106 by using the Plug-and-Play protocol (PnP). Peripheral abstraction 314 provides native support via hardware 316 for input/output (IO) functions for the attached local peripherals namely keyboard 122 (FIG. 1), display 120, pointing device 124, audio device 132 and network 600 (FIG. 6).

Once the local peripherals are plugged in, peripheral abstraction 314 can detect the peripherals and inform mobile communication device 104 as to which particular peripherals are plugged in. For example, if display monitor 120 is inserted into port 118A, peripheral abstraction 314 detects the insertion and simply informs mobile communication device 104 that a display monitor 120 has been plugged in.

Peripheral abstraction 314 need not convey the type, the resolution or other necessary information to mobile communication device 104. Peripheral abstraction 314 simply informs mobile communication device 104 that a display monitor has been plugged in.

Peripheral abstraction 314 also abstracts storage information via storage component 318. Storage component 318 abstracts connected storage devices regardless of where such storage devices are located. In so doing, the mobility and storage capabilities of mobile communication device 104 are extended. In fact, storage component 318 can abstract information to allow for storage via VSL (virtual storage layer) such as those offered by Amazon, IDrive, Carbonite or Google. Here, when extended storage 125 is plugged into port 180D, hardware 316 detects that information and informs mobile communication device 104 that external storage 125 is available for storage.

Figure 4:
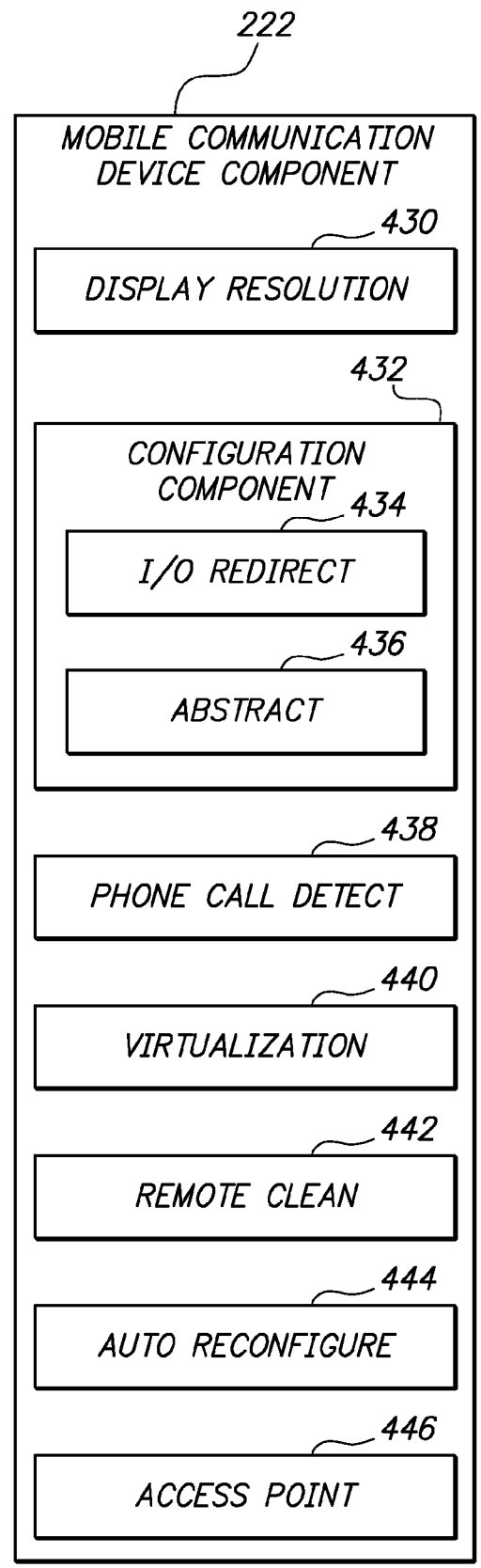
FIG. 4 illustrates a mobile communication device component of FIG. 2 according to an exemplary embodiment of the present invention.

FIG. 4 illustrates mobile communication device component 222 of FIG. 2 according to an exemplary embodiment of the present invention.

In FIG. 4, mobile communication device component 222 includes display resolution 430 and configuration component 432. Display resolution 430 cooperates with display resolution 312 (FIG. 3) to establish the resolution of display monitor 120 (FIG. 1). Configuration component 432 includes I/O redirect 434 as well as abstract 436. Configuration component 432 recognizes the local peripheral abstracts (provided by extender device component 212). That is, abstracts of local peripherals namely display monitor 120, keyboard 122, pointing device 124, external storage 125, audio device 132, network 600 and other peripherals are recognized by configuration component 432.

Configuration component 432 via I/O redirect 434 redirects inputs and outputs between applications residing on mobile communication device 104 and to the peripherals.

Abstract 436 communicates with hardware 316 (FIG. 3) to receive the abstractions for peripherals connected to mobile extender device 106.

Mobile communication device component 222 also includes phone call detect 438. Phone call detect 438 maintains phone calls that are received when mobile communication device 104 and mobile extender device 106 are paired. In one embodiment, phone call detect 438 might suspend the current pairing session when a phone call is either made or received. Upon conclusion of the telephone call, the pairing session is reactivated.

Mobile communication device component 222 also includes virtualization component 440 that enhances the virtualization capabilities of mobile communication device 104. Mobile communication device component 222 also includes remote clean 442, auto reconfigure 444 and access point 446 component. Remote clean 442 enables remote cleaning and deleting of data stored on storage attached to mobile extender device 106 as further described with reference to FIG. 6.

Auto reconfigure 444 stores configuration information related to a particular session, such that if the session is interrupted, for example by power supply loss, mobile communication device 104 and mobile extender device 106 are automatically reconfigured based upon the previously stored configuration information. Access point 446 allows use of the receiver/transmitter adapter of mobile communication interface 224 as an access point by mobile extender device 106 for broadband/Internet access. Use and operation of the present invention will now be described with reference to FIG. 5.

Figure 5:
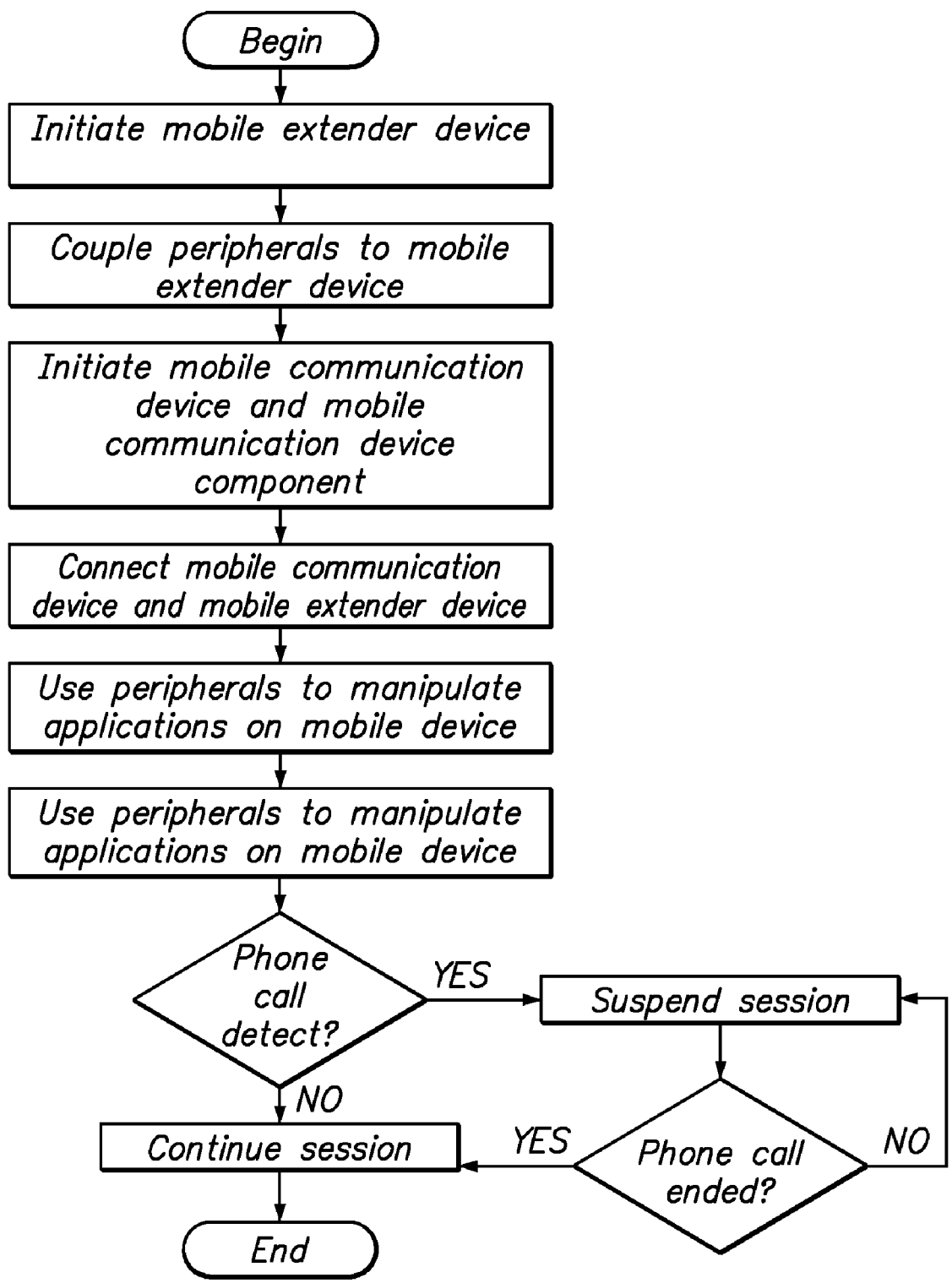
FIG. 5 illustrates use and operation of extensible mobile device system 100 of FIG. 1 according to an exemplary embodiment of the present invention.

FIG. 5 illustrates use and operation of extensible mobile device system 100 of FIG. 1 according to an exemplary embodiment of the present invention.

In FIG. 5, at block 502, user 102 wishing to utilize extensible mobile device system 100 begins by initiating mobile extender device 106 by pressing the power 116 button.

At block 504, user 102 attaches desired peripherals to mobile extender device 106. Specifically, user 102 couples display monitor 120 into port 118A, keyboard 122 into port 118B via Bluetooth, pointing device 124 into port 118C, external storage 125 into port 118D, network 600 into any one or ports 128 and audio device 132 into audio port 130. As the peripherals are coupled, peripheral abstraction 314 via hardware 316 and storage 318 begins to recognize and abstract the connected peripherals.

At block 506, user 102 next initiates mobile communication device 104 by pressing the power button (not shown). Once mobile communication device 104 is initiated, processor 216 and operating system 218 (FIG. 2) begin to run mobile communication device component 222 (in an embodiment wherein mobile communication device component 222 is computer code. After power-up, communication interface 224 is initiated and begins to use its Wi-Fi adapter to scan for available networks.

At block 508, mobile extender device 106 has shown up as part of the available network displayed to mobile communication device 104. User 102 then selects mobile extender device 106. Mobile communication device 104 is authenticated by mobile extender device 106 after which communication link 204 (FIG. 2) is then established.

At block 510, user 102 can then begin to utilize all of the peripherals associated with mobile extender device 106 while the necessary processing power is furnished by processor 216 of mobile communication device 104. Particularly, user 102 can operate keyboard 122 and pointing device 124 to manipulate applications residing on mobile communication device 104.

Here, mobile communication device 104 can be inserted in base 114 to keep the device upright. User 102 can then utilize pointing device 124 to select e-mail icon 105A on display monitor 120 (FIG. 1) and initiate and utilize e-mail application residing on mobile communication device 104. User 102 can also run applications or browsers residing on mobile communication device 104 by selecting browser icon 103A, for example.

Information intended for mobile communication device 104 is sent to mobile extender device 106. As an example, when pointing device 124 selects email icon 105A, operating system 208 signal peripheral abstraction 314, which passes that information to configuration component 232 of mobile communication device 104 and operating system 218 in order to initiate the email application.

As noted above, user 102 can run applications or browsers residing on mobile communication device 104 by using icons 103A and 105A, for example. Note that icon 103A and 105A are not necessarily mirror images of icon 103 and 105 and do not imply that data and applications are mirrored between communication device 104 and mobile extender device 106 (and display 120). User 102, for example, can initiate a browser application on mobile communication device 104 without icon 103 being displayed.

At decision block 512, phone call detect 438 determines whether a phone call has been received or whether user 102 is making a phone call. If a phone call has been received or a phone call is being been made, at block 514, mobile extender device 106 temporarily suspends the current session.

At decision block 516, it is determined whether the phone call has ended. If yes, processing moves to block 518 and the current session is reinstated and continued. If the phone call has not ended, processing returns to block 514.

Returning now to decision block 512, if a phone call is not detected, processing continues to block 518 to reactivate the session; thereafter, the session can be ended by user 102 by powering down either mobile extender device 106 or mobile communication device 104.

FIG. 6 illustrates extensible mobile network 600 according to an exemplary embodiment of the present invention.

In FIG. 6, extensible mobile network 600 includes server 602 communicably coupled via LAN 604 to a plurality of paired mobile communication devices and mobile extender devices. In particular, extensible mobile network 600 includes mobile communication device 104 and mobile extender device 106, mobile communication device 606 and mobile extender device 608, mobile communication device 610 and extender device 612, mobile communication device 614 and extended device 616.

Extensible mobile network 600 might be one that is typically found in an enterprise setting. One advantage of the present invention is that all each mobile extender device 106, 608, 612 and 614 can access Internet 620 via each respective mobile communication device. Another advantage of extensible network 600 is that server 602 can perform a remote clean of storage devices (not shown) attached to each of the extended devices. A further advantage is inclusion of embedded SIP (Session Initiation Protocol) and H.323 VoIP (Voice over Internet Protocol) clients and support, integration with corporate VoIP's infrastructure, enhanced connectivity to public/free SIP/H.323 providers.

While the above is a complete description of exemplary specific embodiments of the invention, additional embodiments are also possible. Thus, the above description should not be taken as limiting the scope of the invention, which is defined by the appended claims along with their full scope of equivalents.

I claim:

1. An extensible system for extending resource capabilities of a mobile communication device by pairing the mobile communication device and a mobile extender device, said mobile extender device having peripheral ports that receive standard peripherals, wherein said standard peripherals include a keyboard device, a pointing device, a display device and a networking adapter, the extensible system comprising:
   a communication component incorporated by the mobile extender device, wherein the communication component uses a wireless access protocol to establish a connection with the mobile communication device;
   a hardware abstraction component incorporated by the mobile extender device, wherein the hardware abstraction component abstracts basic input and output and local standard peripherals coupled to the mobile extender device, said local standard peripherals including a keyboard device, a pointing device, a display device, a network adapter and a storage device;
   a first display resolution component incorporated by the mobile extender device;
   an application specific integrated chip (ASIC) incorporated by the mobile extender device, wherein said ASIC includes an embedded operating system and memory to process signals between the mobile communication device, the hardware abstraction component and the first display resolution component;
   a second display resolution component incorporated by the mobile communication device, said second display resolution component working cooperatively with the first display resolution component to establish a resolution for the display device attached to the mobile extender device;
   a configuration component incorporated by the mobile communication device, wherein said configuration component recognizes abstracts of the local peripherals provided by the client abstraction component, wherein said configuration component redirects inputs and outputs between applications residing on the mobile communication device and the abstracted local peripherals;
   a mobile communication device processor; and
   a mobile communication device operating system and memory, wherein a user can utilize the standard peripherals including the storage device to manipulate applications on the mobile communication device as if such applications were being manipulated by mobile communication device input devices and wherein such applications utilize the mobile communication device processor and operating system and memory as proves necessary for processing.

2. The extensible system of claim 1 further comprising a call preserve component that maintains phone calls received when the mobile communication device and the mobile extender device are paired.

3. The extensible system of claim 1 further comprising a virtualization component incorporated by the mobile communication device, wherein said virtualization component enhances virtualization capabilities of the mobile communication device.

4. The extensible system of claim 1 further comprises an access point component incorporated by the mobile communication device for providing wireless access to the mobile extender device.

5. The extensible system of claim 1 further comprising an auto reconfiguration component for automatically re-pairing the mobile communication device and the mobile extender device when a pairing session is interrupted.

6. The extensible system of claim 1 further comprising a storage device attachable to said mobile extender device.

7. The extensible system of claim 1 further comprising a central server for remotely wiping and cleaning storage devices attached to the mobile extender device.

8. A system comprising:
   one or more processors; and
   logic encoded in one or more tangible media for execution by the one or more processors and when executed operable to provide:
   a communication component incorporated by a mobile extender device, wherein the communication component uses a wireless access protocol to establish a connection with the mobile communication device;
   a hardware abstraction component incorporated by the mobile extender device, wherein the hardware abstraction component abstracts basic input and output and local standard peripherals coupled to the mobile extender device, said local standard peripherals including a keyboard device, a pointing device, a display device, a network adapter and a storage device;
   a first display resolution component incorporated by the mobile extender device;
   an application specific integrated chip (ASIC) incorporated by the mobile extender device, wherein said ASIC includes an embedded operating system and memory to process signals between the mobile communication device, the hardware abstraction component and the first display resolution component;
   a second display resolution component incorporated by the mobile communication device, said second display resolution component working cooperatively with the first display resolution component to establish a resolution for the display device attached to the mobile extender device;
   a configuration component incorporated by the mobile communication device, wherein said configuration component recognizes abstracts of the local peripherals provided by the client abstraction component, wherein said configuration component redirects inputs and outputs between applications residing on the mobile communication device and the abstracted local peripherals;
   a mobile communication device processor; and
   a mobile communication device operating system and memory, wherein a user can utilize the standard peripherals including the storage device to manipulate applications on the mobile communication device as if such applications were being manipulated by mobile communication device input devices and wherein such applications utilize the mobile communication device processor and operating system and memory as proves necessary for processing.

9. The extensible system of claim 1 further comprises logic encoded in one or more tangible media to provide a call preserve component that maintains phone calls received when the mobile communication device and the mobile extender device are paired.

10. The extensible system of claim 1 further comprises logic encoded in one or more tangible media to provide a virtualization component incorporated by the mobile communication device, wherein said virtualization component enhances virtualization capabilities of the mobile communication device.

11. The extensible system of claim 1 further comprises logic encoded in one or more tangible media to provide an access point component incorporated by the mobile communication device for providing wireless access to the mobile extender device.

12. The extensible system of claim 1 further comprises logic encoded in one or more tangible media to provide an auto reconfiguration component for automatically re-pairing the mobile communication device and the mobile extender device when a pairing session is interrupted.

13. The extensible system of claim 1 further comprises logic encoded in one or more tangible media to provide a storage device attachable to said mobile extender device.

14. The extensible system of claim 1 further comprises logic encoded in one or more tangible media to provide a central server for remotely wiping and cleaning storage devices attached to the mobile extender device.

* * * * *